United States Patent
Zhao et al.

(10) Patent No.: US 7,764,491 B2
(45) Date of Patent: Jul. 27, 2010

(54) SUPPORT STAND FOR FLAT-PANEL DISPLAY MONITOR

(75) Inventors: Cheng-He Zhao, Shenzhen (CN); Zhi-Guo Sun, Shenzhen (CN); Zhi-Bin Liu, Shenzhen (CN)

(73) Assignees: Hong Fu Jin Precision Industry (ShenZhen) Co., Ltd., Shenzhen Guangdong Province (CN); Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 42 days.

(21) Appl. No.: 12/205,928

(22) Filed: Sep. 8, 2008

(65) Prior Publication Data

US 2009/0256047 A1    Oct. 15, 2009

(30) Foreign Application Priority Data

Apr. 11, 2008    (CN)    ................ 2008 1 0301102

(51) Int. Cl.
  *G06F 1/16*    (2006.01)
(52) U.S. Cl. ................................. 361/679.22
(58) Field of Classification Search ............ 361/679.22
  See application file for complete search history.

(56) References Cited

U.S. PATENT DOCUMENTS

| | | | | |
|---|---|---|---|---|
| 4,640,485 A | * | 2/1987 | Day et al. ............... | 248/422 |
| 4,690,362 A | * | 9/1987 | Helgeland ............... | 248/404 |
| 6,134,103 A | * | 10/2000 | Ghanma ................ | 361/679.05 |
| 7,014,154 B2 | * | 3/2006 | Jeong et al. ............. | 248/157 |
| 7,124,984 B2 | * | 10/2006 | Yokouchi et al. ......... | 248/125.8 |
| 7,168,665 B2 | * | 1/2007 | Hong et al. ............. | 248/125.1 |
| 7,389,963 B2 | * | 6/2008 | Cho et al. .............. | 248/159 |
| 7,424,991 B2 | * | 9/2008 | Kim et al. .............. | 248/125.9 |
| 7,564,682 B2 | * | 7/2009 | Liou et al. ............. | 361/679.22 |
| 7,611,103 B2 | * | 11/2009 | Ha et al. ............... | 248/125.2 |
| 2004/0011932 A1 | * | 1/2004 | Duff .................. | 248/157 |
| 2004/0084579 A1 | * | 5/2004 | Lee et al. .............. | 248/125.1 |
| 2006/0219849 A1 | * | 10/2006 | Chiu .................. | 248/125.8 |
| 2006/0231697 A1 | * | 10/2006 | Hsu ................... | 248/125.9 |
| 2007/0064379 A1 | * | 3/2007 | Shin .................. | 361/681 |

* cited by examiner

*Primary Examiner*—Lisa Lea-Edmonds
(74) *Attorney, Agent, or Firm*—Zhigang Ma

(57) ABSTRACT

An exemplary support stand for a flat-panel display monitor, includes a base member, an elevating mechanism, and a rotatable mechanism. The elevating mechanism includes a support member and an elevating member. The support member is fixed on the base member. The elevating member is slidably connected to the support member. The rotatable mechanism includes a rotatable body. The rotatable body is rotatably positioned on the elevating member.

19 Claims, 7 Drawing Sheets

SUPPORT STAND FOR FLAT-PANEL DISPLAY MONITOR

BACKGROUND

1. Technical Field

The present disclosure generally relates to support stands, and particularly to a support stand for a flat-panel display monitor.

2. Description of the Related Art

Flat-panel display monitors, such as liquid crystal display monitors, offer advantages over cathode ray tubes such as reduced size, smaller weight, and better image quality. A viewing angle and a height of the flat-panel display monitor can be adjusted without moving a support stand of the flat-panel display monitor because of its small weight.

Referring to FIG. 7, one such support stand generally includes a base member 11, an elevating mechanism 13, a rotatable bracket 15, and a monitor bracket 17. The monitor bracket is configured for attaching to a flat-panel display monitor (not shown). The rotatable bracket 15 is configured for connecting the monitor bracket 17 and the elevating mechanism 13. The elevating mechanism 13 is positioned on the base member 11.

The elevating mechanism 13 includes an elevating member 131, two pivot shafts 132, a support member 133, two mounting barrels 134, two guiding members 135, and two coiled springs 137. The elevating member 131 includes two mounting portions 136 formed at an end and defines a plurality of oil grooves 138 in opposite side portions of the elevating member 131. The oil grooves 138 are configured for storing lubricating oil. The support member 133 defines two guide grooves (not labeled) at opposite sides for receiving the side portions of the elevating member 13. Each coiled spring 137 includes a coiled portion (not labeled) and a free portion (not labeled) connecting to the coiled portion.

To assemble the elevating mechanism 13, the guiding members 135 are sleeved on the opposite side portions of the elevating member 131 correspondingly. The opposite side portions of the elevating member 131 together with the guiding members 135 are slidably received in the guide grooves of the support member 133 correspondingly. Thus, the elevating member 131 is capable of sliding relative to the support member 133. The coiled portion of each coiled spring 137 is sleeved on each of the mounting barrels 134, and the free portion of each coiled spring 137 is fixed to the support member 133. Each of the pivot shaft 132 is passed through each of the mounting barrels 134 and fixed to each of the mounting portions 136 of the elevating member 131.

The monitor bracket 17 is rotatably connected to the rotatable bracket 15 by a pivot shaft 155 so that the flat-panel display monitor is rotatable with the monitor bracket 17. The viewing angle of the flat-panel display monitor can be adjusted by rotating the rotatable bracket 15 relative to the elevating mechanism 13. The height of the flat-panel display monitor can be adjusted by the elevating mechanism 13.

The support stand further includes a rotatable mechanism 19. The rotatable mechanism 19 includes a rotatable member 192 and a support base 194. An upper surface of the rotatable member 192 is fixed to the base member 11 and a bottom surface of the rotatable member 192 is rotatably mounted on the support base 194. Thus, the rotatable member 192 can be rotated with the base member 11 relative to the support base 194, that is, the flat-panel display monitor can be rotated relative to the support base 194.

However, the elevating mechanism 13 of the support stand has a complicated structure, thus it is inconvenient to manufacture and assemble the elevating mechanism 13. In order to rotate the flat-panel display monitor, an extra mechanism (the rotatable mechanism 19) should be provided. Therefore, the cost of the support stand is relatively high. In addition, the rotatable mechanism 19 cannot restrict a rotation angle of the flat-panel display monitor. Further, because the support base 194 support the weight of all of the other components, thus a high friction may be created between the rotatable member 192 and the support base 194. As a result, a user may need to exert great effort on the flat-panel display monitor in order to be able to rotate the flat-panel display monitor with the rotatable member 192 relative to the support base 194.

Therefore, a new support stand for a flat-panel display monitor is desired in order to overcome the above-described shortcomings.

SUMMARY

A support stand for a flat-panel display monitor, includes a base member, an elevating mechanism, and a rotatable mechanism. The elevating mechanism includes a support member and an elevating member. The support member is fixed on the base member. The elevating member is slidably connected to the support member. The rotatable mechanism includes a rotatable body. The rotatable body is rotatably positioned on the elevating member.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present support stand for a flat-panel display monitor. Moreover, in the drawings, like reference numerals designate corresponding parts throughout the several views.

DETAILED DESCRIPTION

Figure 1:
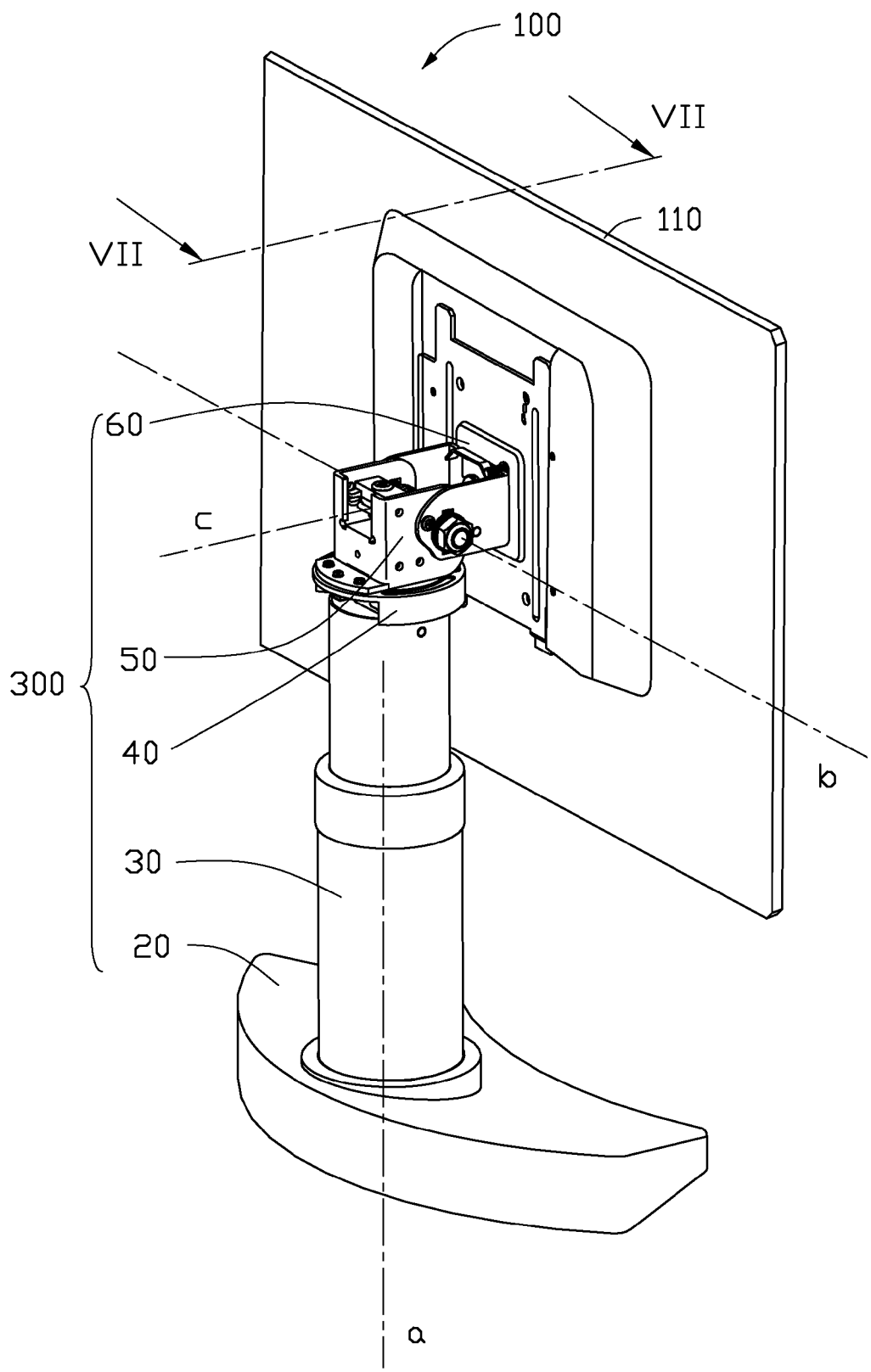
FIG. 1 is an assembled isometric view of a support stand in accordance with an exemplary embodiment of the present disclosure, and showing a flat-panel display monitor mounted on the support stand.

Referring to FIG. 1, a flat-panel display monitor 100 includes a display body 110 and a support stand 300 for supporting the display body 110. The support stand 300 includes a base member 20, an elevating mechanism 30, a rotatable mechanism 40, rotatable bracket module 50, and a monitor bracket module 60. The rotatable mechanism 40 is configured for connecting the elevating mechanism 30 and the rotatable bracket module 50. The rotatable mechanism 40 is rotatable relative to the elevating mechanism 30, thus the display body 110 can be rotated around an a-axis relative to the base member 20. The rotatable bracket module 50 is positioned between the rotatable mechanism 40 and the monitor bracket module 60, and the display body 110 can be rotated around a b-axis. The monitor bracket module 60 is positioned between the rotatable bracket module 50 and the display body 110, and the display body 110 can be rotated around a c-axis.

Referring to FIGS. 2 through 6, the base member 20 is shaped as a substantially arched sheet and defines a circular mounting groove 21.

Figure 6:
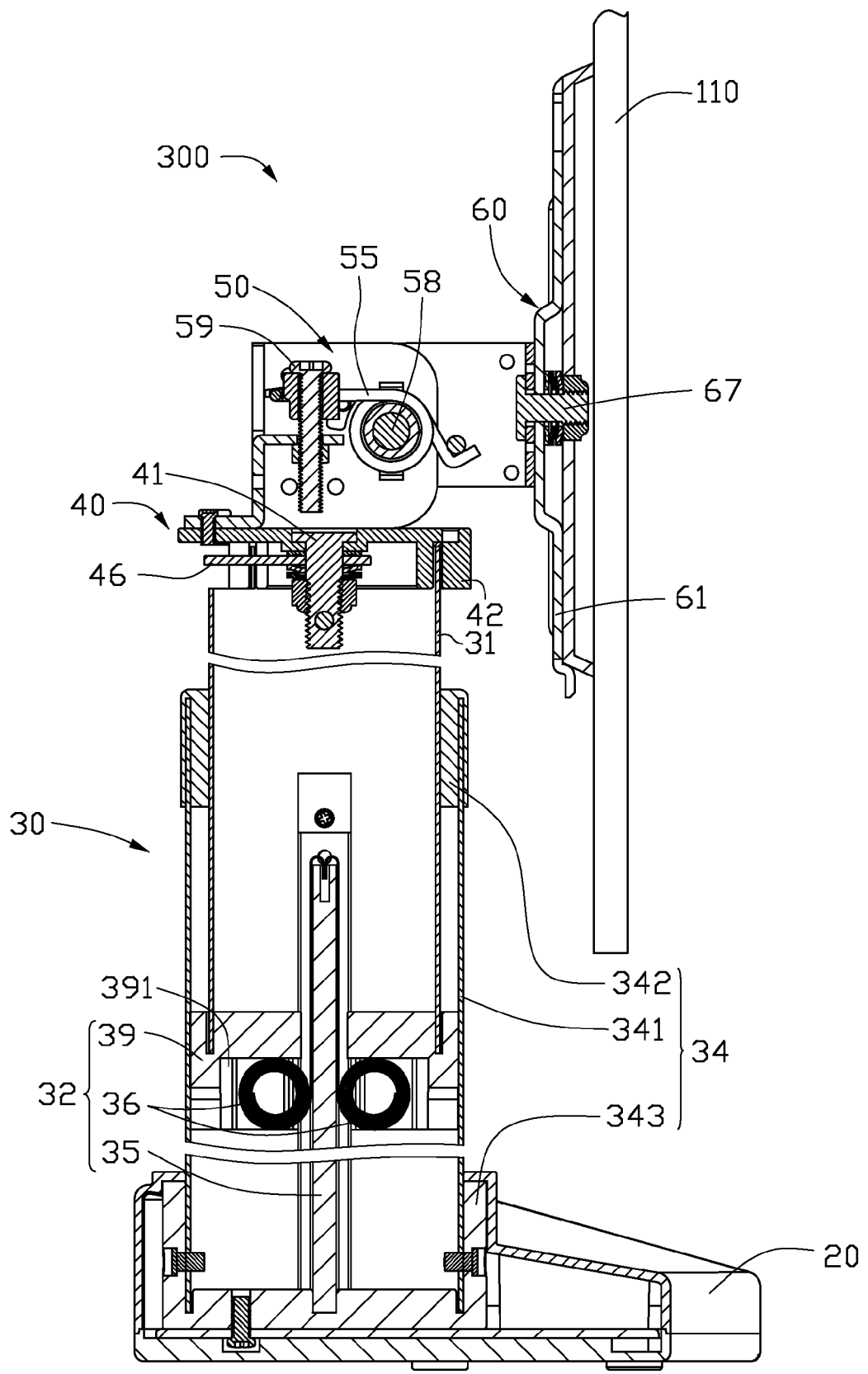
FIG. 6 is a cross-sectional view of the support stand in FIG. 1, taken along the line VII-VII.
Figure 7:
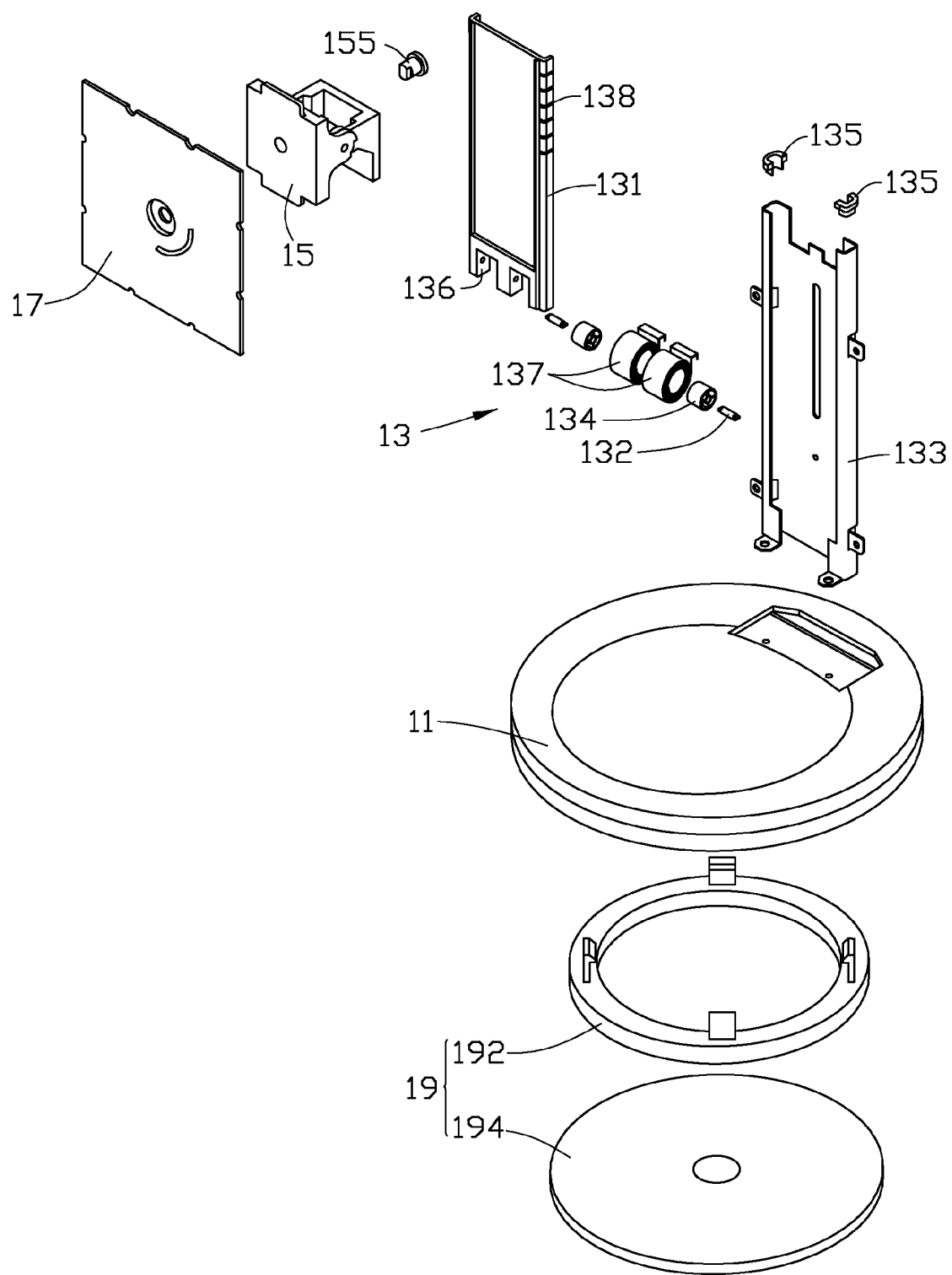
FIG. 7 is an exploded isometric view of a conventional support stand.

The elevating mechanism 30 includes an elevating member 31, a resilient module 32, and a supporting module 34 (shown in FIG. 6). The elevating member 31 is capable of sliding along the support module 34. The resilient module 32 is disposed in the supporting module 34.

The elevating member 31 is a cylindrical sleeve. The elevating member 31 defines a restricting notch 311 in a side wall adjacent to a top end and two pin holes 317 (shown in FIG. 3) through the side wall adjacent to the restricting notch 311. The elevating member 31 further defines two through holes (not labeled) in a bottom end opposite to the top end.

The resilient module 32 includes a mounting bracket 35, two coiled springs 36, and a movable member 39.

The supporting module 34 includes a support member 341, a support lid 342, and a support body 343. The support member 341, the support lid 342, and the support body 343 are all cylindrical sleeves. The support body 343 corresponds to the mounting groove 21 of the base member 20. A first end of the support member 341 is configured to be connected to the support lid 342 and a second end opposite to the first end of the support member 341 is configured to be inserted in the support body 343.

The mounting bracket 35 is shaped as a substantially rectangular sheet. The mounting bracket 35 defines a latching groove 351 in a top end and two guide grooves 352 in opposite side walls. Two restricting portions 38 are formed at opposite sides of the top end for restricting the movable member 39 when the movable member 39 is moved to an utmost position (highest position).

Each of the coiled springs 36 includes a latching portion 361, a connecting portion 362, and a coiled portion 363. The connecting portion 362 interconnects the latching portion 361 and the coiled portion 363. The coiled springs 36 are configured to be mounted at opposite side surfaces of the mounting bracket 35 correspondingly, with the latching portions 361 latched in the latching groove 351. It should be understood that, the latching groove 351 of the mounting bracket 35 can be omitted, and the coiled springs 36 can be fixed to the mounting bracket 35 by fixing members such as screws.

The movable member 39 is shaped substantially as a cylinder and defines a deformed hole 393 in a middle portion. The deformed hole 393 is shaped substantially as a rectangular hole defined by two parallel first inner surfaces (not labeled) and two parallel second inner surfaces (not labeled). Each of the first inner surfaces of the deformed hole 393 is perpendicular to each of the second inner surfaces of the deformed hole 393. The movable member 39 includes two arched protrusions 394. Each arched protrusion 394 is formed at a middle portion of one of the fist inner surfaces of the deformed hole 393. The protrusions 394 are configured to decrease a friction created between the protrusions 394 and the connecting portions 362 of the coiled springs 36. The movable member 39 defines a mounting groove 391 (shown in FIG. 6) for receiving the coiled portions 363 of the coiled springs 36. The movable member 39 defines a circular groove 395 in the top portion for receiving a bottom end of the elevating member 31. The circular groove 395 surrounds the deformed hole 393. The movable member 39 further defines two pin holes (not labeled) for receiving two pins 397. The pin holes communicate with the circular groove 395. The movable member 39 further includes two sliding protrusions (not shown) correspondingly formed on the two second inner surfaces of in the deformed hole 393 for engaging with the guide grooves 352 of the mounting bracket 35.

The movable member 39 is configured to be sleeved on the mounting bracket 35 via the deformed hole 393. The movable member 39 is capable sliding in the supporting module 34 because of extension or shrinkage of the coiled springs 36. The elevating member 31 can be driven to move by the movable member 39. In the illustrated embodiment, the movable member 39 may be made of plastic material, and has a rough outer surface for engaging with an inner surface of the support member 341, thus to create enough friction. It should be pointed out that, the sliding protrusions may be formed on the opposite side walls of the mounting bracket 351, and the movable member 39 correspondingly defines the guide grooves 352 in the two second inner surfaces of the deformed hole 393 for engaging with the sliding protrusions.

It should be pointed out that, a number of the coiled springs 36 may not be two.

Referring to FIG. 3 again, the rotatable mechanism 40 includes a pivot shaft 41, a rotatable body 42, a pin 43, a fixing member 44, and a block member 46. The pivot shaft 41 includes a flange (not labeled) and a non-circular shaft portion (not labeled) extending from the flange. The shaft portion defines a plurality of threads (not labeled) in a middle and a through hole 413 adjacent to an end opposite to the flange. The rotatable body 42 includes a circular main portion 421 and a cylindrical side portion 426 perpendicular extending from a circumferential edge of the main portion 421. The main portion 421 defines a stepped hole 422 in the middle. The side portion 426 defines a limiting notch 423 corresponding to the restricting notch 311 of the elevating member 31. The rotatable body 42 is configured to be rotatably mounted on the elevating member 31, thus the limiting notch 423 of the rotatable body 42 and the restricting notch 311 of the elevating member 31 cooperatively define a restricting hole (not labeled). The pin 43 is a cylindrical shaft configured to pass through the pin holes 317 of the elevating member 31 and the through hole 413 of the pivot shaft 41. The fixing member 44 is a nut for engaging with the shaft portion of the pivot shaft 41. The block member 46 includes a circular middle portion (not labeled) and a restricting portion (not labeled) extending from an edge of the middle portion. The middle portion defines a non-circular hole for the shaft portion of the pivot shaft 41 to pass through. The restricting portion of the block member 46 is configured to extend through the limiting notch 423 of the rotatable body 42, thereby restricting a rotatable range of the rotatable body 42.

Referring to FIG. 4 again, the rotatable bracket module 50 includes a mounting bracket 51, a rotatable bracket 53, and a rotatable shaft 58. The rotatable bracket 53 is rotatably connected to the mounting bracket 51 via the rotatable shaft 58. The rotatable bracket 53 is capable of rotating around the b-axis (shown in FIG. 1) of the rotatable shaft 58. The rotatable bracket module 50 further includes two friction washers 583 sleeved on the rotatable shaft 58 to create a friction force for retaining the rotatable bracket 53 when the rotatable bracket 53 stops rotating relative to the mounting bracket 51. The mounting bracket 51 includes a base wall (not labeled) and two side walls (not labeled) perpendicularly extending form opposite sides of the base wall. The base wall of the mounting bracket 51 defines a threaded hole (not labeled) in a middle portion. Each side wall of the mounting bracket 51 defines an arched restricting hole 533. The rotatable bracket module 50 further includes two restricting screws 532 for being fixed to opposite side walls (not labeled) of the rotatable bracket 53 correspondingly. An end of each of the restricting screws 532 is movably received in each of the restricting holes 533 of the mounting bracket 51, thereby restricting the rotatable range of the rotatable bracket 53. The rotatable bracket module 50 further includes an adjusting assembly 59. The adjusting assembly 59 includes a torsion spring 55, a mounting sleeve (not labeled), an adjusting screw 591, and a pressing member 593. The torsion spring 55 includes two spring coils (not labeled), a pressing arm 554 formed between the two spring coils, and two extending ends (not labeled) extending from the spring coils. The pressing arm 554 is substantially n-shaped or U-shaped. The pressing member 593 defines a threaded hole (not labeled) in a middle for the adjusting screw 591 extending through.

Referring to FIGS. 5 and 6 again, the monitor bracket module 60 includes a monitor bracket 61, a pair of friction washers 63, a restricting bracket 65, and a pivot shaft 67. The monitor bracket 61 is rotatably connected to the rotatabe bracket 53 via the pivot shaft 67. The friction washers 63 is configured to be sleeved on the pivot shaft 67, thus creating a friction force for retaining the monitor bracket 61 when the monitor bracket 61 stops rotating relative to the rotatable bracket 53. The monitor bracket 61 defines a restricting hole 61 4 for receiving a restricting screw 631. Two restricting surfaces 652 are formed at opposite sides of the restricting bracket 65 for blocking the restricting screw 631, thus restricting the rotatable range of monitor bracket 61. The restricting bracket 65 defines a round hole in a middle for the pivot shaft 67 to rotatably pass through.

Figure 2:
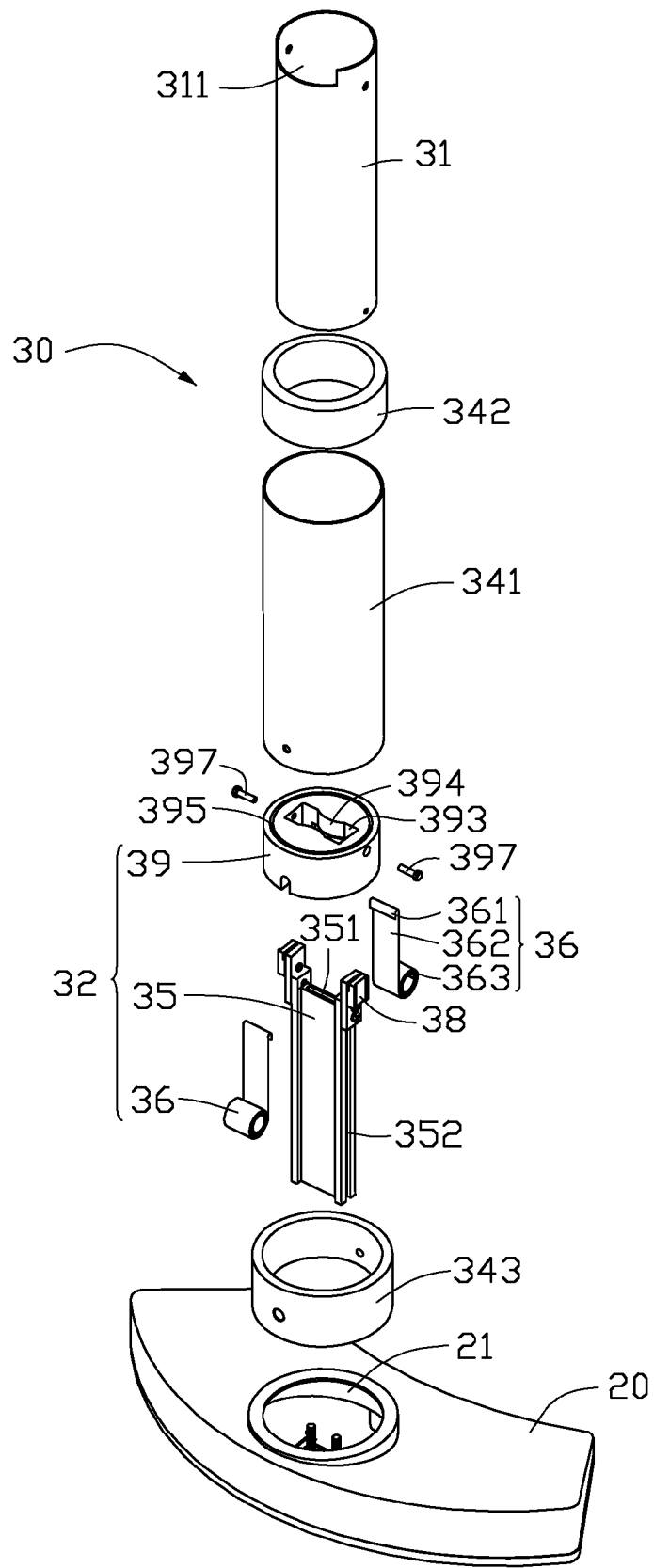
FIG. 2 is an exploded isometric view of an elevating mechanism of the support stand in FIG. 1.
Figure 3:
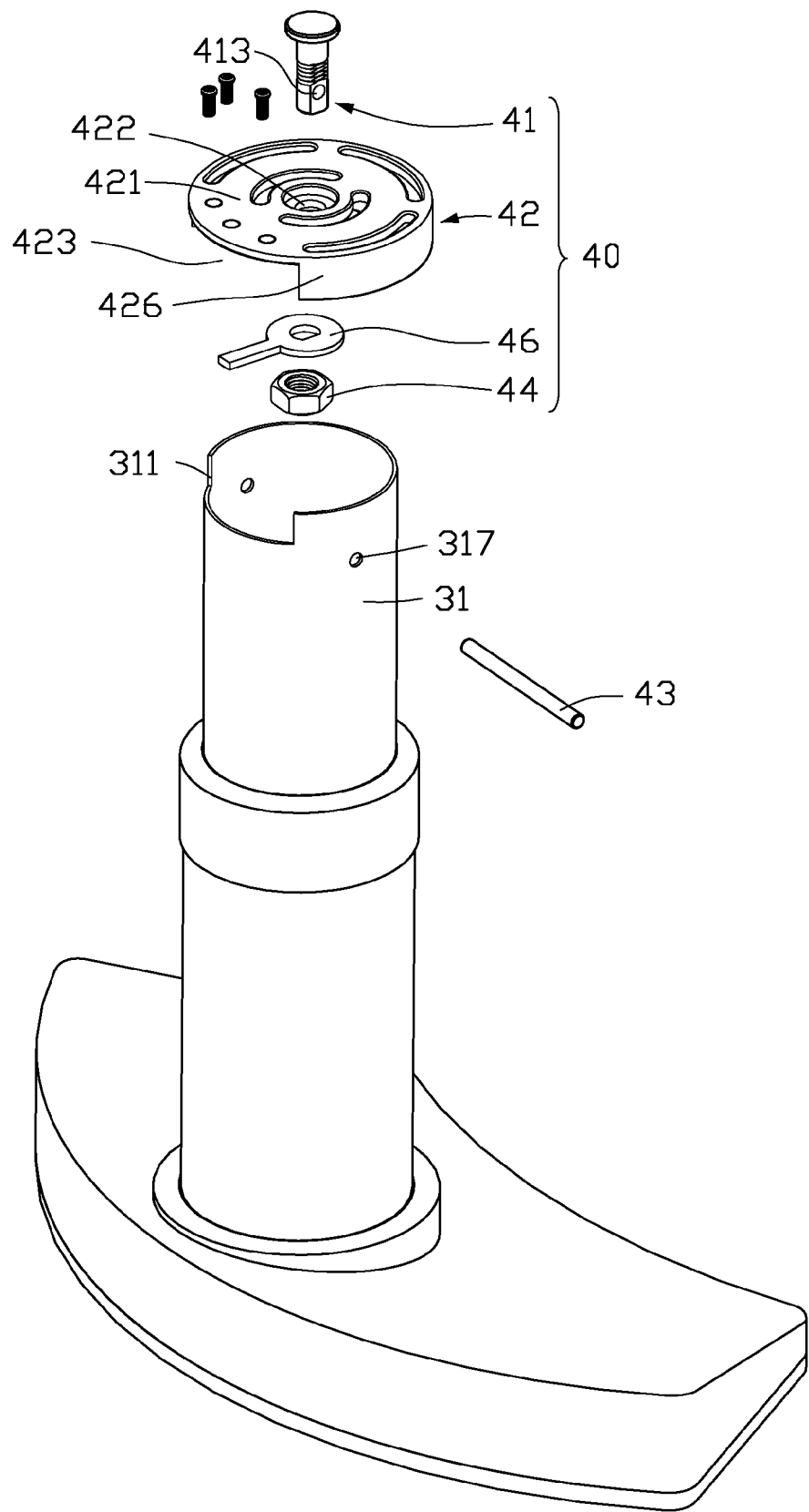
FIG. 3 is an exploded isometric view of a rotatable mechanism of the support stand in FIG. 1.
Figure 4:
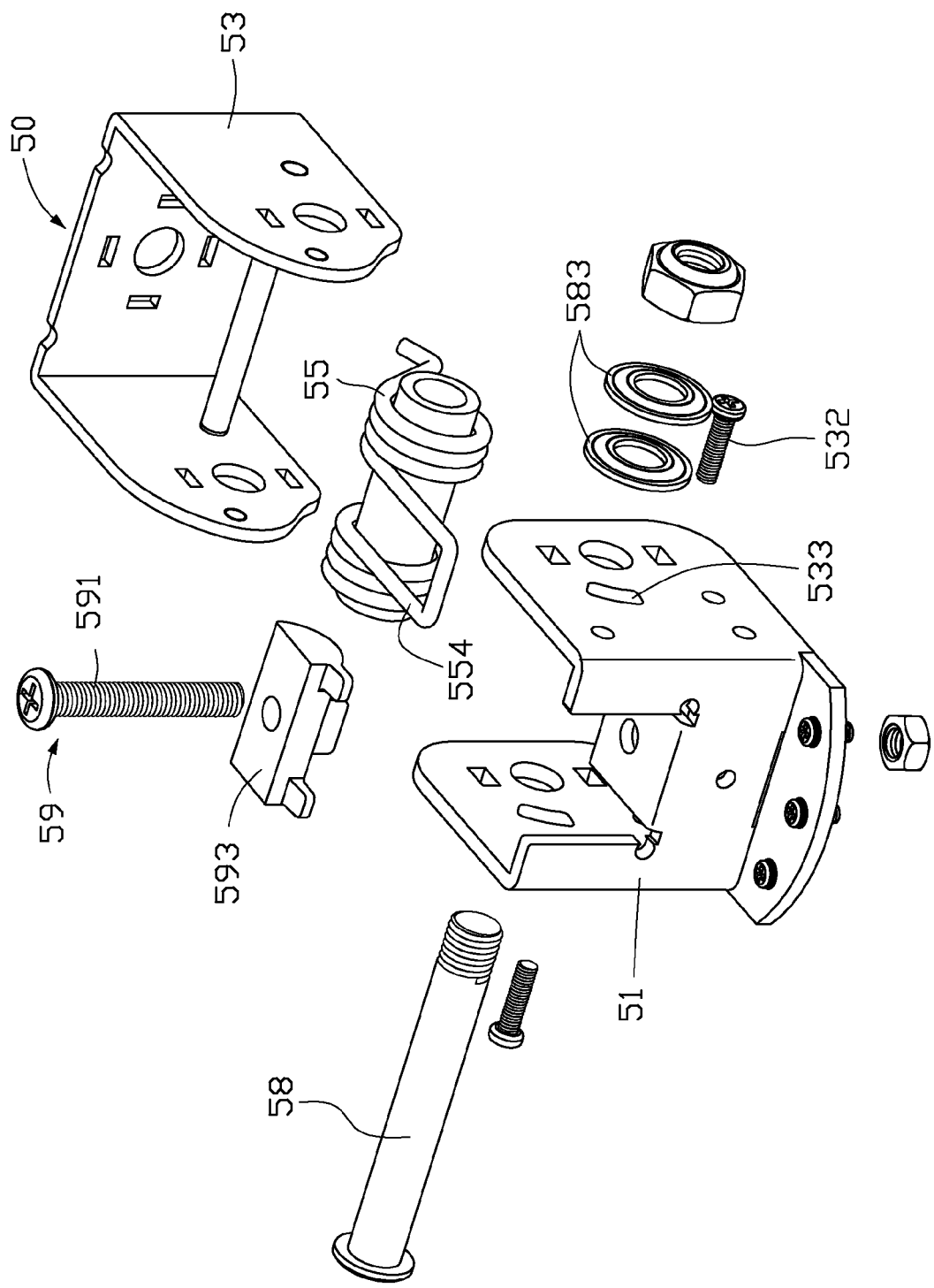
FIG. 4 is an exploded isometric view of a rotatable bracket module of the support stand in FIG. 1.
Figure 5:
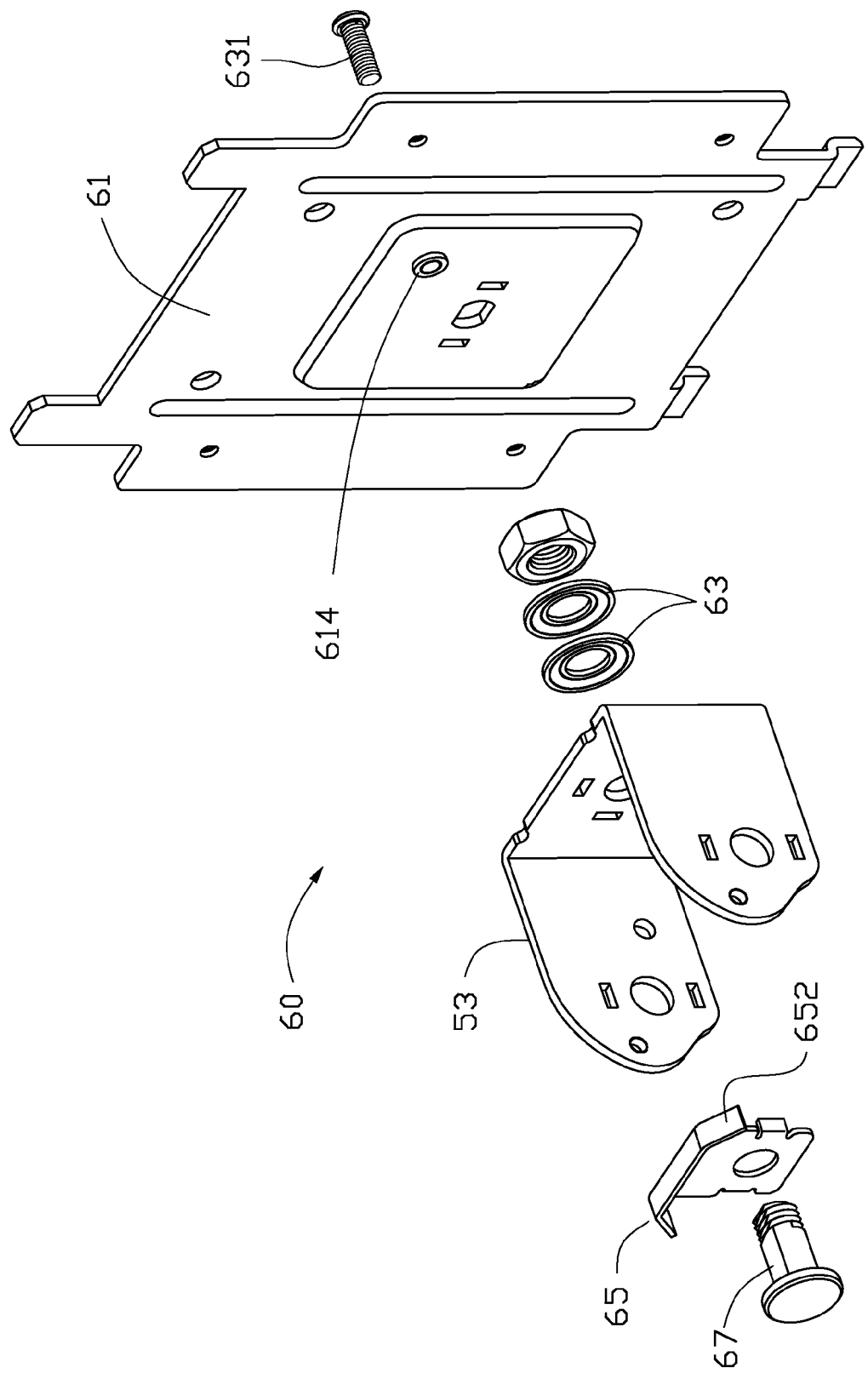
FIG. 5 is an exploded isometric view of a monitor bracket module of the support stand in FIG. 1.

Referring to FIGS. 2 and 6, the support stand 300 may be assembled as follows. The support body 343 is fixed in the mounting groove 21 of the base member 20. A bottom end of the support member 341 is fixed to the support body 343. A bottom end of the mounting bracket 35 is passed through the deformed hole 393 of the movable member 39. The coiled springs 36 are positioned at opposite side surfaces of the mounting bracket 35 correspondingly. The latching portions 361 of the coiled springs 36 are passed through the deformed hole 393 of the movable member 39 and latched in the latching groove 351 of the mounting bracket 35. The coiled portions 363 of the coiled springs 36 are received in the mounting groove 391 of the movable member 39. A bottom end of the elevating member 31 is inserted into the circular groove 395 of the movable member 39. Each of the pins 397 is passed through each of the pin holes of the movable member 39 and each corresponding through hole of the elevating member 31. The mounting bracket 35 with the movable member 39 is received in the support member 341, and a bottom end of the support member 341 is fixed to the base member 20. Thus, the movable member 39 is capable of sliding along the mounting bracket 35 in the support member 341. The support lid 342 is sleeved on a top end of the support member 341.

To assemble the rotatable mechanism 40, the shaft portion of the pivot shaft 41 is passed through the stepped hole 422 of the rotatable body 42, the non-circular hole of the block member 46, and engaged with the fixing member 44. The rotatable body 42 is positioned on the elevating member 31, with the restricting portion of the block member 46 extending through the limiting notch 423 of the rotatable body 42, thereby restricting a rotatable range of the rotatable body 42. The pin is consecutively passed through a first of the holes 317 of the elevating member 31, the through hole 413 of the pivot shaft 41, and a second of the holes 317 of the elevating member 31.

To assemble the rotatable bracket module 50, the torsion spring 55 is sleeved on the mounting sleeve. The torsion spring 55 with the mounting sleeve is positioned between the side walls of the mounting bracket 51. The restricting screws 532 are fixed to opposite side walls of the rotatable bracket 53 correspondingly. An end of each of the restricting screw 532 is movably received in each of the restricting holes 533 of the mounting bracket 51, thereby restricting the rotatable range of the rotatable bracket 53. The extending ends of the torsion spring 55 abut a restricting pole of the rotatable bracket 53. The rotatable shaft 58 is passed through a first of the side walls of the rotatable bracket 53, a first of the side walls of the mounting bracket 51, the mounting sleeve, a second of the side walls of the mounting bracket 51, a second of the side walls of the rotatable bracket 53, the friction washers 583, and then fixed with a nut. The pressing member 593 is positioned on the pressing arm 554 of the torsion spring 55, the adjusting screw 591 is passed through the threaded hole of the pressing member 593, and engages in the threaded hole of the base wall of the mounting bracket 51. Thus, an elastic force created by the torsion spring 55 can be adjusted by the adjusting screw 591. The mounting bracket 51 of the rotatable bracket module 50 is fixed to the rotatable body 42 of the rotatable mechanism 40 via screws.

To assemble the monitor bracket module 60, the restricting bracket 65 is fixed to the rotatable bracket 53. The pivot shaft 67 is passed through the round hole of the restricting bracket 65, the base wall of the rotatable bracket 53, the monitor bracket 61, the friction washers 63, and fixed with a nut. The restricting screw 631 is passed through the restricting hole 614 of the monitor bracket 61. Thus, the support stand 300 is assembled.

In use, the display body 110 is fixed to the monitor bracket 61. The display body 110 can be moved upwards or downwards together with the monitor bracket module 60 and the rotatable bracket module 50 when the elevating member 31 slides along the support member 341 of the supporting module 34. To lower an altitude of the display body 110, an external force is applied on the display body 110 pressing the elevating member 31 with the movable member 39 to slide downwards along the support member 341. When the elevating member 31 slides to a predetermined position, the external force is released. The elevating member 31 with the display body 110 and other components supported by the elevating member 31 remain in the predetermined position by an elastic force of the coiled spring 36 and a friction force created between the movable member 39 and the support member 341. To raise the altitude of the display body 110, another external force is applied on the display body 110 lifting the elevating member 31 with the movable member 39 to slide upwards relative to the support member 341 to another predetermined position. When the movable member 39 is moved to an utmost position (highest position), the movable member 39 is prevented from moving upwards any further by the restricting portions 38 of the mounting bracket 35.

When the display body 110 needs to be rotated around the a-axis, an external force is applied on the display body 110 rotating the rotatable body 42 around a central axis (the a-axis) of the elevating member 31. The rotatable range of the rotatable body 42 is limited by the block member 46 and the limiting notch 423 of the rotatable body 42.

When the display body 110 needs to be rotated around the b-axis, an external force is applied on the display body 110 for rotating the rotatable bracket 53 around a central axis (the b-axis) of the rotatable shaft 58. When the elastic force created by the torsion spring 55 needs to be changed, the adjusting screw 591 is adjusted.

When the display body 110 needs to be rotated around the c-axis, an external force is applied on the display body 110 for rotating the monitor bracket 61 around a central axis (the a-axis) of the pivot shaft 67. The restricting surfaces 652 of the restricting bracket 65 are capable of restricting the rotatable range of the monitor bracket 61.

The elevating member 31 and the support member 341 of the support stand 300 are both cylindrical structures, thus it is easy to manufacture and assemble the elevating member 31 and the support member 341. Therefore, the cost of the support stand 300 is relatively low. In addition, the rotatable mechanism 40 is assembled on the elevating member 31, thus the rotatable body 42 avoids supporting the weight of all of the other components and a friction created between the rotatable member the rotatable body 42 and the elevating member 31 is decreased. When the display body 110 is rotated with the rotatable body 42, the elevating mechanism 30 is not rotated with the rotatable body 42, thus a user can easily rotate the display body 110 with the rotatable body 42 relative to the base member 20. Further, the rotatable range of the rotatable body 42 is limited by the block member 46 and the limiting notch 423 of the rotatable body 42. The restricting surfaces 652 of the restricting bracket 65 are capable of restricting the rotatable range of the monitor bracket 61.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A support stand for a flat-panel display monitor, comprising:
   a base member;
   an elevating mechanism comprising:
      a support member fixed on the base member; and
      an elevating member being slidably connected to the support member;
   a rotatable mechanism including a rotatable body rotatably positioned on the elevating member;
   and a rotatable bracket module comprising a mounting bracket, a rotatable bracket, and a rotatable shaft, wherein the rotatable bracket is rotatably connected to the mounting bracket by the rotatable shaft, and the mounting bracket is fixedly mounted on the rotatable body.

2. The support stand as claimed in claim 1, wherein the elevating mechanism further comprises a resilient module including a mounting bracket, at least one coiled spring, and a movable member; the mounting bracket is positioned in the support member and having an end fixed to the base member; the movable member is slidably sleeved on the mounting bracket and an end of the elevating mechanism is fixed to the movable member; each of the least one coiled spring comprises a latching portion and a coiled portion connected to the latching portion, the latching portion is fixed to the mounting bracket and the coiled portion is received in the movable member.

3. The support stand as claimed in claim 2, wherein a number of the at least one coiled spring is two, the two coiled springs are mounted at opposite side surfaces of the mounting bracket; the mounting bracket defines a latching groove in a top end, the latching portions of the coiled springs are latched in the latching groove.

4. The support stand as claimed in claim 3, wherein the movable member defines a deformed hole in a middle portion, an end of the mounting bracket opposite to the top end is inserted through the deformed hole.

5. The support stand as claimed in claim 4, wherein the movable member comprises two arched protrusions formed at opposite inner surfaces of the deformed hole, each of the coiled springs comprises a connecting portion for connecting the coiled portion and the latching portion, each of the protrusions abuts a connecting portion of each of the coiled springs.

6. The support stand as claimed in claim 3, wherein the movable member comprises two restricting portions formed at opposite sides of the top end for preventing the movable member from sliding out of the top end.

7. The support stand as claimed in claim 1, wherein the rotatable mechanism further comprises a pivot shaft, a first end of the pivot shaft is fixedly connected to the elevating member and a second end of the pivot shaft is rotatably connected to the rotatably body.

8. The support stand as claimed in claim 7, wherein the rotatable mechanism further comprises a block member, the elevating member defines a restricting notch in a side wall adjacent to a top end, the rotatable body defines a limiting notch corresponding to the restricting notch, an end of the block member positioned between the limiting notch and the restricting notch for restricting a rotatable range of the rotatable body relative to the elevating mechanism.

9. The support stand as claimed in claim 1, wherein the rotatable bracket module further comprises an adjusting assembly positioned between the mounting bracket and the rotatable bracket; the adjusting assembly comprises a torsion spring, an adjusting screw, and a pressing member; the torsion spring comprises a pressing arm and the torsion spring is sleeved on the rotatable shaft for creating a elastic force between the mounting bracket and the rotatable bracket; the pressing member is positioned on the pressing arm; the adjusting screw is screwed in the pressing member for adjusting the elastic force.

10. The support stand as claimed in claim 1, wherein the support stand further comprises a monitor bracket module including a pivot shaft and a monitor bracket, the monitor bracket is rotatably connected to the rotatable bracket of the rotatable bracket module by the pivot shaft.

11. The support stand as claimed in claim 10, wherein the monitor bracket module further comprises restricting bracket and a restricting screw; the restricting bracket is rotatably sleeved on the pivot shaft and fixed to the rotatable bracket; the monitor bracket defines a restricting hole, the restricting screw is passed through the restricting hole; two restricting surfaces are formed at opposite sides of the restricting bracket for blocking the restricting screw such that the rotatable range of monitor bracket is restricted.

12. A flat-panel display monitor, comprising:
   a display body; and
   a support stand for supporting the display body, the support stand comprising:
      a base member;
      an elevating mechanism comprising:
         a support member fixed on the base member; and
         an elevating member being slidably connected to the support member;
      a rotatable mechanism including a rotatable body rotatably positioned on the elevating member;

a rotatable bracket module mounted on the rotatable body; and a monitor bracket module being rotatably connected to the rotatable bracket module, and the display body being supported by the monitor bracket.

13. The flat-panel display monitor as claimed in claim 12, wherein the elevating mechanism further comprises a resilient module including a mounting bracket, two coiled springs, and movable member; the mounting bracket is positioned in the support member and having an end fixed to the base member; the movable member is slidably sleeved on the mounting bracket and an end of the elevating mechanism is fixed to the movable member; each of the coiled springs comprises a latching portion and a coiled portion connected to the latching portion; the coiled springs are mounted at opposite side surfaces of the mounting bracket; the mounting bracket defines a latching groove in a top end, the latching portions of the coiled springs are latched in the latching groove, the coiled portions of the coiled spring are received in the movable member.

14. The flat-panel display monitor as claimed in claim 13, wherein the movable member defines a deformed hole in a middle portion, an end of the mounting bracket opposite to the top end is inserted through the deformed hole; the movable member comprises two arched protrusions formed at opposite inner surfaces of the deformed hole, each of the coiled springs comprises a connecting portion for connecting the coiled portion and the latching portion, each of the protrusions abuts a connecting portion of each of the coiled springs.

15. The flat-panel display monitor as claimed in claim 12, wherein the rotatable mechanism further comprises a pivot shaft, a first end of the pivot shaft is fixedly connected to the elevating member and a second end of the pivot shaft is rotatably connected to the rotatably body.

16. The flat-panel display monitor as claimed in claim 15, wherein the rotatable mechanism further comprises a block member, the elevating member defines a restricting notch in a side wall adjacent to a top end, the rotatable body defines a limiting notch corresponding to the restricting notch, an end of the block member positioned between the limiting notch and the restricting notch for restricting a rotatable range of the rotatable body relative to the elevating mechanism.

17. The flat-panel display monitor as claimed in claim 12, wherein the rotatable bracket module comprises a mounting bracket, a rotatable bracket, and a rotatable shaft; the rotatable bracket is rotatably connected to the mounting bracket by the rotatable shaft; the mounting bracket is fixed to the rotatable body.

18. The flat-panel display monitor as claimed in claim 17, wherein the rotatable bracket module further comprises an adjusting assembly positioned between the mounting bracket and the rotatable bracket; the adjusting assembly comprises a torsion spring, an adjusting screw, and a pressing member; the torsion spring comprises a pressing arm and the torsion spring is sleeved on the rotatable shaft for creating a elastic force between the mounting bracket and the rotatable bracket; the pressing member is positioned on the pressing arm; the adjusting screw is screwed in the pressing member for adjusting the elastic force.

19. The flat-panel display monitor as claimed in claim 17, wherein the monitor bracket module comprises a pivot shaft, a monitor bracket, a restricting bracket, and a restricting screw; the monitor bracket is rotatably connected to the rotatable bracket by the pivot shaft; the restricting bracket is rotatably sleeved on the pivot shaft and fixed to the rotatable bracket; the monitor bracket defines a restricting hole, the restricting screw is passed through the restricting hole; two restricting surfaces are formed at opposite sides of the restricting bracket for blocking the restricting screw such that the rotatable range of monitor bracket is restricted.

* * * * *